Nov. 30, 1965 R. W. REACH, JR 3,221,310

PARITY BIT INDICATOR

Filed July 11, 1960 3 Sheets-Sheet 1

INVENTOR.
ROY W. REACH, JR.

BY Henry L. Hanson

ATTORNEY

FIG. 3A
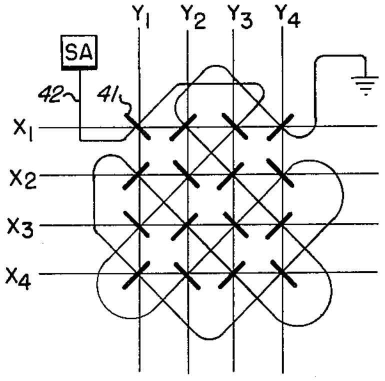
FIG. 3B
| | Y1 = 00 | Y2 = 01 | Y3 = 10 | Y4 = 11 |
|---|---|---|---|---|
| X1 = 00 | + | − | − | + |
| X2 = 01 | − | + | + | − |
| X3 = 10 | − | + | + | − |
| X4 = 11 | + | − | − | + |
FIG. 4
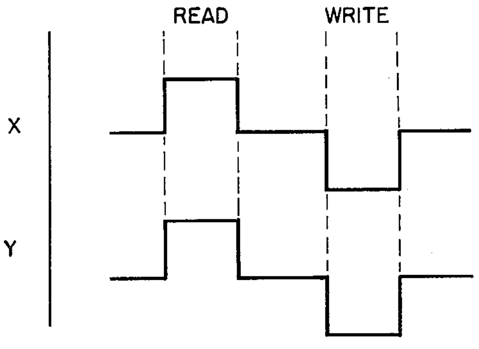
INVENTOR.
ROY W. REACH, JR.
BY Henry L. Hanson
ATTORNEY INVENTOR.
ROY W. REACH, JR.
BY Henry L. Hanson
ATTORNEY

United States Patent Office 3,221,310
Patented Nov. 30, 1965

3,221,310
PARITY BIT INDICATOR
Roy W. Reach, Jr., Sudbury, Mass., assignor to Honeywell Inc., a corporation of Delaware
Filed July 11, 1960, Ser. No. 41,899
4 Claims. (Cl. 340—174)

A general object of the present invention is to provide a new and improved electrical apparatus useful in the checking of the operation of a data processing circuit. More specifically, the present inveniton is adapted for the checking of a memory facility in a data processing circuit wherein it is desirable to make an accurate determination as to whether or not an address location in a memory was actually selected in accordance with the address signals supplied to the memory.

High-speed digital storage circuits are utilized in data processing systems in order to provide ready access to data processing instructions and data processing information usable in the carrying out of preselected operations with the data processing systems. A widely used form of high-speed memory for a data processing system is the coincident current memory such as is described in the J. W. Forrester Patent Number 2,736,880, issued February 28, 1956. In such a memory, the memory circuits are divided into a series of separate storage locations which are addressable or are defined by unique addresses. The storage facility at each unique address takes the form of a series of bistable magnetic core devices, each of which is threaded by a pair of selection wires, both of which must be activated in a predetermined sense in order to switch the bistable state of the core device. This selecting scheme, as well as the reading and writing of information into selected locations in the memory, is more fully disclosed in the abovementioned Forrester patent.

In data processing systems, the addressing of a memory circuit is usually effected by way of a suitable numerical code which defines a numerical address in the memory. If the numerical code is a pure binary code, or a binary coded decimal code, the actual address carried in the data processing system may well comprise a plurality of "ones" and "zeros." In order to utilize such a coded numerical address in a coincident current memory, where only two address lines out of a large number of address lines are to be activated at any one time, it is necessary to decode the numerical address to provide the desired selection within the memory.

In order to be certain that the addressing of the memory has been properly carried out, it is desirable that there be some check made to see that the address actually selected agrees with the original address supplied to the circuit.

It is accordingly a further more specific object of the present invention to provide a new and improved checking circuit for a memory which has a plurality of addressable memory locations which may be uniquely selected by an input numerical address with means checking to see that the address actually selected agrees with the input address.

In accordance with the teachings of the present invention, there is provided an address selection checking means which comprises a plurality of magnetic core devices which are arranged to be selectively operated in accordance with an incoming address to produce, in an output sense winding coupled thereto, a suitable coded check representation which may be appropriately compared with the input address to ensure that the selection made agrees with the input address. A convenient way to arrange this in a coincident current memory is to provide an additional set of core elements appropriately related to the core elements of the memory section wherein these core elements are adapted to be selectively switched in a manner corresponding to those in the storage section of the memory. The actual implementation may take the form of one or more additional memory planes in a multiple plane memory stack wherein the output from the additional plane or planes will take the form of a parity bit representing a "one" or a "zero" which will serve to indicate whether an odd or an even address has been selected. By utilizing a pair of memory planes, it is possible to provide an even more sophisticated check wherein a pair of output circuits may be monitored against each other to check for proper operation of the output circuits.

It is therefore a further object of the present invention to provide apparatus for producing a parity bit which is indicative of an address selected in a memory unit.

A still further more specific object of the invention is to provide an apparatus for producing a parity bit indication of an address selected in the memory unit wherein the checking or parity-producing circuitry comprises a plurality of magnetic core devices, one of which is adapted to be selectively activated for an input address, and to provide a signal indicative of the parity of a selection address.

A still further more specific object of the invention is to provide a selection checking scheme for a coincident current memory having a plurality of memory planes wherein the checking circuitry includes one or more planes whose outputs are arranged to selectively provide a parity indication of the address selected, which indication may be appropriately compared with the input address.

The foregoing objects and features of novelty which characterize the invention, as well as other objects of the invention, are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Figure 1:
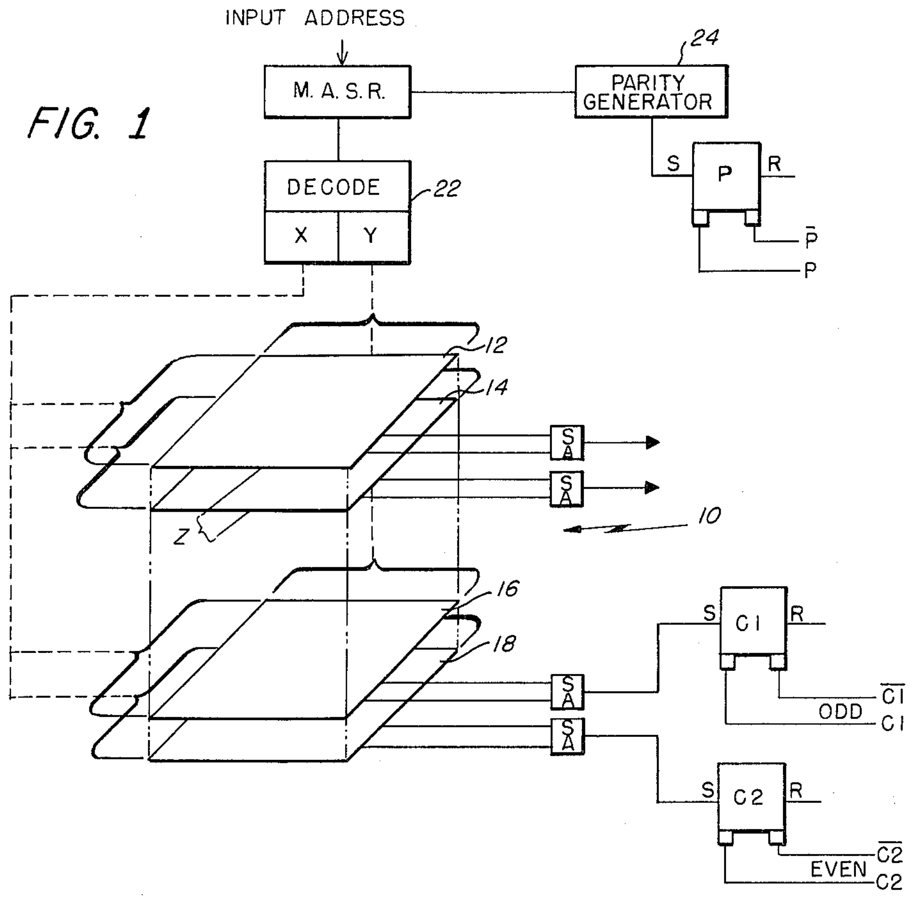
FIGURE 1 is the diagrammatic representation of a representative form of the invention.
Figure 5:
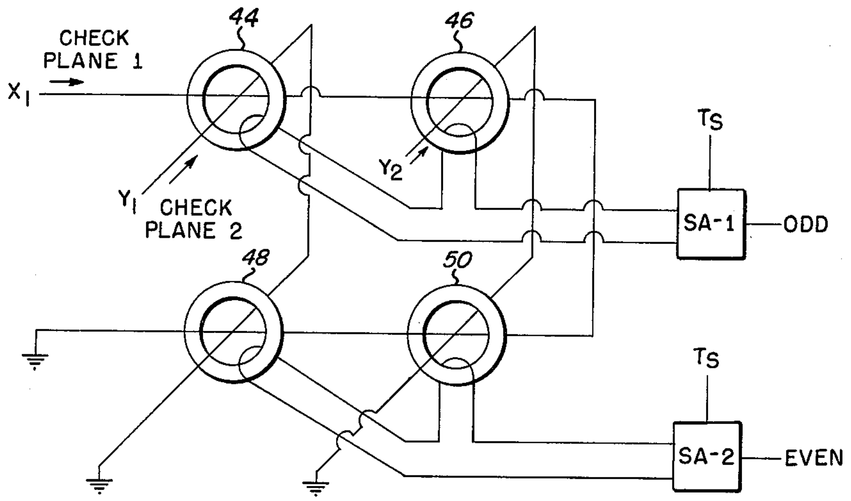

FIGURES 3A and B represent a portion of the apparatus which may be associated with the circuitry of FIGURE 1;

FIGURE 4 represents the wave forms of switching signals applied to the circuitry of FIGURE 3; and FIGURE 5 represents one way in which a sense winding may be wound in a core plane containing a plurality of magnetic cores.

Referring first to FIGURE 1, the numeral 10 identifies a coincident current memory which may well be of the type described in the above mentioned Forrester patent.

The memory comprises a plurality of planes such as the planes 12 and 14. Each of the planes has a plurality of cores arranged therein a matrix with appropriate input selection wires arranged so that each core in each plane is uniquely threaded by a combination of two input selection wires, one of which is conveniently designated as an X access wire, and the other of which may be conveniently designated as a Y access wire. Also included in the memory circuit 10 are a pair of checking planes 16 and 18 which may well be wired with magnetic cores in a manner which corresponds to the wiring of the storage planes 12 and 14. The cores in the planes 16 and 18 are assumed to be identically addressed with the cores in the storage planes 12 and 14.

The storage planes 12 and 14 incorporate an input Z winding which is adapted to control the writing operation in each of the planes. A similar Z winding is not used in the checking planes 16 and 18 inasmuch as data is not stored in the planes 16 and 18.

A sense winding is also assumed to be threading each of the cores in each memory plane, and these sense windings are assumed to be further coupled to the sense amplifiers SA on the outputs thereof. These sense amplifiers SA for planes 16 and 18 are of a type which will pass only signals of one polarity, positive or negative, received from the sense winding connected thereto.

The input to the memory unit, insofar as the addressing is concerned, originates from an input address which is adapted to be inserted by a suitable input transfer to a memory address selection register 20. The address selection register 20 has an output which is coupled to a suitable decoding network 22. The function of the decoding network is to take the input address code and provide for the energization of a single output X wire and a single Y wire which is uniquely indicative of the input address. The actual form of the decoding network may be a well-known diode conversion circuit or any other well-known type of conversion circuit.

The address selection register 20 may also have coupled thereto a parity generator 24 which is adapted to have inserted therein the input address which is making a selection in the memory 10. The output of the parity generator 24 may be suitably applied to a parity flip-flop P which will be set or reset in accordance with whether or not the data or parity bit from the generator is a "one" or a "zero."

Connected to the outputs of the sense amplifiers SA associated with the planes 16 and 18 are a pair of checking flip-flops C1 and C2, the latter being adapted to be set when the apropriate sense amplifier has a positive output therefrom. The output of the checking flip-flop C1 and C2 will be indicative of whether or not the address actually selected within the memory planes 16 and 18 represents an odd or an even parity bit. Thus, if the numerical address selected is one which is odd, the checking flip-flop C1 will be set. If the input numerical address is even, the checking flip-flop C2 will be set. In its elemental form, a parity bit is conveniently associated with the number of "ones" and "zeros" which make up a particular binary coded item. Insofar as the present checking scheme is concerned, however, the presence of an add or even parity bit indication will be controlled by the particular core in the memory plane which is actually addressed by the address selection circuits.

Considering the over-all operation of the circuitry of FIGURE 1, an input address will be applied to the memory address selection register 20. The address will then be decoded by the decoding circuit 22 to select a particular core location in each of the storage planes 12, 14, and any others provided, so that data may be read out of that address location or written into that address location. As the data from the address selection register 20 is operating on the memory 10, the address data may also be suitably examined by the parity generator 24 which will set the parity flip-flop P in accordance with whether there is an odd or even number of "ones" in the input address. It is assumed further that if there is an even number of "ones" in the input address, that the parity flip-flop P will be set so that the output line P from the flip-flop will be active.

If the proper selection has been made in the memory 10, the cores in the checking planes 16 and 18 at the desired address location will be switched and if selected properly, there will be an even parity indication derived from the plane 18. Consequently, the output checking flip-flop C2 will be set and the checking flip-flop C1 will remain reset.

Figure 2:
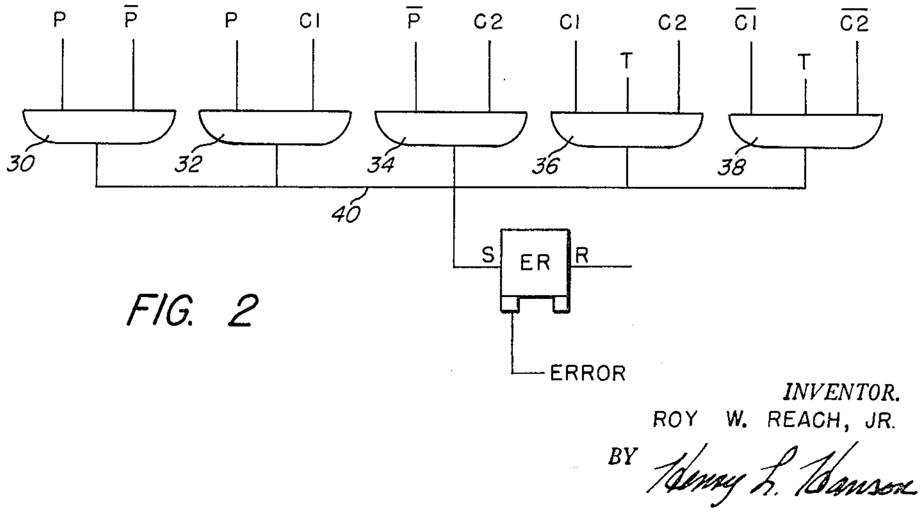
FIGURE 2 represents the logical circuitry for producing an error indication.

In order to provide for the checking of the outputs of the parity flip-flop P and the checking flip-flops C1 and C2, suitable logical gating circuitry, such as illustrated in FIGURE 2, may be provided. In FIGURE 2, there are provided a series of gating sections 30, 32, 34, 36 and 38. Each of these gating sections is buffered together on a common buffer line 40 which leads to an error flip-flop ER, which is adapted to be set if any one of the input gating sections passes an input signal. The gating section 30 is provided to indicate the proper operation of the parity flip-flop P. Should both sides of the flip-flop be active at the same time, it is desired that this be appropriately indicated and an error signal produced. The gating section 32 is provided to indicate whether or not the input parity corresponds with the selected parity insofar as the addressing is concerned. Thus, if the input gate leg P is active to indicate that there are an even number of "ones" in the input address, the input line C1 should not be active at the same time, since this would indicate that the selection was an address having an odd number of "ones" therein. In a similar manner, the gate 34 functions to check the situation when there are an odd number of "ones" produced by the parity generator 24 to thereby leave the parity flip-flop P in the reset state. An error should be indicated if the input gate leg $\overline{P}$ is active and the input C2 is active.

The gating circuits 36 and 38 are used to examine the checking flip-flops C1 and C2 to ensure that they are both not in either the set or the reset state at the time that a timing pulse T is applied thereto.

Referring next to FIGURE 3A, there is further illustrated a typical way of winding a sense winding in a plurality of cores. The sense winding is identified by the numeral 42 and it will be seen that this sense winding threads the cores in such a manner that half the cores are threaded in one direction, while the remaining half of the cores are threaded in the opposite direction. This method of winding the sense winding is usually adopted for purposes of minimizing the unwanted signals resulting from half-select currents supplied to the cores in the course of the addressing of the memory.

The reason for this will be understood by noting the input signals used to drive the cores of the memory. These are shown in FIGURE 4. The read signals, which may be as indicated in FIGURE 4, are applied to the X and Y wires which may be associated with the cores of FIGURE 3A. If the core 41, which is at the intersection of the $X_1$ and $Y_1$ address lines is the selected core, it is desired that this core be the only core to produce an appreciable output signal in the sense winding 42. Inasmuch as the $X_1$ selection wire will pass through all of the cores on that particular line, the half-select current will have a tendency to produce a signal in each of the other cores, but will be insufficient to switch those cores because the magnitude of this select signal is only half that required to effect the actual switching of the core, as is discussed in the abovementioned Forrester patent. Once the reading operation has taken place in the cores of the plane, a writing operation will follow with an opposite polarity signal being applied to the appropriate X and Y selection lines. This will reset the core which had been set during the read operation.

It will be noted that there are sixteen cores illustrated in the memory plane of FIGURE 3A. The addressing of the individual cores may be by an input address code abcd in binary form. Thus, to address the sixteen cores, the address should be a binary number between 0000 and 1111. The truth table in FIGURE 3B shows a typical decoding chart for the sixteen cores of FIGURE 3A. The presence of a plus sign in the square associated with the address lines $X_1$ and $Y_1$ indicates a plus signal will be produced in the sense winding associated with the core at that location. This may be considered as a parity bit directly related to the input address of 0000. Should the address change to 0010, the address lines $X_1$ and $Y_2$ will be active. The core at the intersection of these two lines will not have a positive output as indicated by the minus sign at that location in the truth table. The absence of a positive signal here will indicate that there are an odd number of "ones" in the address.

The circuit of FIGURE 3A will thus be seen capable of producing a parity bit indication related to the input address. As the absence of a plus signal may be the result of equipment failure, it is desirable to have an affirmative indication of the desired parity bit related to the input address whether this be a "one" or "zero" bit. For this purpose, the circuitry of FIGURE 5 is provided.

In accordance with the principles discussed above in connection with FIGURE 1, two memory planes may be assigned to the checking operation. A selected detail of circuitry associated with a pair of planes is illustrated in FIGURE 5. Checking plane 1 is assumed to include a pair of bistable core devices 44 and 46. Checking plane 2 is assumed to include a further pair of bistable core devices 48 and 50. It will be noted that the cores 44, 46, 48 and 50 are threaded by an $X_1$ selection wire. It will further be noted that the core elements 44 and 48 are threaded by the same $Y_1$ selection wire. Similarly, the cores 46 and 50 are threaded by a $Y_2$ selection wire. The current passing through the $X_1$ selection wire flows in one direction through the core devices 44 and 46, and in the opposite direction through the core devices 48 and 50. Similarly, the current flowing through the $Y_1$ selection wire will pass in one direction through the core device 44, and in the opposite direction through the core device 48. The sense windings associated with each of the core devices are connected to the sense amplifier associated with the particular plane. The sense windings in the cores 44 and 46 are wound opposite with respect to each other and insofar as their respective cores are concerned. Similarly, the sense windings for the cores 48 and 50 are wound oppositely with respect to each other. The sense windings in each plane may be wound as illustrated in FIGURE 3.

Assuming that an address selection of address lines $X_1$ and $Y_1$ is made and this represents an address location having an even parity, the output sense winding on the core 44 will have a negative signal thereon produced by the operation of the read signal switching the core. Inasmuch as the current flow through the core 44 is reversed from that flowing in the core 48, the sense winding associated with the core 48 will have a positive output thereon. This positive signal will be passed through the sense amplifier to produce an even parity bit indication which may be used to set a flip-flop such as illustrated in FIGURE 1 at C2.

Assuming further that the address lines $X_1$ and $Y_2$ define an address having an odd parity, the energization of the lines X1 and Y2 will be seen to produce a positive pulse in the sense winding in the core 46, and a negative pulse in the sense winding in the core 50 for the reason that the sense windings on these cores are opposite the sense of the sense windings of the cores 44 and 48. Consequently, the upper sense amplifier SA will have an output which may be used to set, for example, the C1 flip-flop in FIGURE 1.

Both of the sense amplifiers are arranged to be strobed during the time of the read interval by a timing signal $T_S$. During the write cycle, the cores will all be reset and there will be no output from either of the sense amplifiers for the reason that the strobe timing signal $T_S$ will not be applied thereto.

By using the wiring configurations as illustrated in FIGURE 5, it is possible to use a pair of memory planes wired in a manner similar to the memory planes associated with the storage of information. The checking plane, however, does not require any data input control winding. The truth table illustrated in FIGURE 3B may be used to represent one plane of the pair of planes of FIGURE 5. The other plane may have a truth table which is reversed. The affirmative indication for both odd and even parity then becomes readily apparent.

It will be readily apparent from a consideration of the foregoing that there has been provided a mechanism capable of checking to see whether or not an input address to a memory system has actually selected the address as specified. It will be further seen that there have been provided means for indicating the presence of an error if the selection has not been made in the desired manner, and further means for indicating that an error condition may exist in the checking circuitry.

The foregoing parity checking scheme has been achieved using a minimum of electrical hardware. Should it be desired to extend the power of the check beyond a parity bit, additional planes may be added with the sense windings arranged in the negative planes so that the switching of the cores in any one address will produce a coded output representing a modulo 3, modulo 9, or the like type of check. The underlying principles will be those discussed above.

While, in accordance with the provisions of the statutes, there has been illustrated and described the best forms of the invention known, it will be apparent to those skilled in the art that changes may be made in the apparatus described without departing from the spirit of the invention as set forth in the appended claims and that, in some cases, certain features of the invention may be used to advantage without a corresponding use of other features.

Having now described the invention, what is claimed as new and novel and for which it is desired to secure Letters Patent is:

1. In combination, a coincident current memory comprising a plurality of memory planes each of which has a predetermined number of memory units therein and each unit of which is uniquely defined by two address lines and has a sense winding coupled thereto, an address storage register, address decoding means connected between said register and the address lines of said memory to select corresponding memory units in each memory plane, address selection checking means connected to said decoding means to produce a first bit code indicative of the address actually selected in said memory, said address selection checking means comprising a pair of said plurality of memory planes all of whose memory units normally reside in the same state, a pair of sense windings with one each for the units of each plane of said pair, said sense windings being coupled to the units in each plane of said pair opposite that of the coupling to the units of the other, code generating means connected to said register and responsive to the output thereof to generate a second bit code indicative of the address, and comparison means connected to said address selection checking means and said code generating means.

2. Apparatus for producing a parity bit indicative of an address selected in a memory, comprising a plurality of bistable cores normally residing in the same state, address selection means coupled to each of said cores so that for any address, two cores will generate an output indicative of odd or even parity, a pair of output circuits coupled to said two cores, and checking means coupled to said output circuits to indicate an error when both outputs are the same.

3. Apparatus as set forth in claim 2 wherein said pair of output circuits comprises a pair of sense amplifiers having means for sensing input pulses of one polarity only.

4. Apparatus for producing a parity bit indicative of an address selected in a memory, comprising a plurality of bistable cores normally residing in the same state, address selection means coupled to each of said cores so that for any address, two cores will generate an output indicative of odd or even parity, a pair of output circuits coupled to said two cores, and checking means coupled to said output circuits comprising a plurality of gating circuits, means including a first pair of said gating circuits for indicating when said pair of outputs has the same output signal thereon, and means including a second pair of gating circuits for indicating when an input parity bit does not match an output parity bit.

References Cited by the Examiner

UNITED STATES PATENTS

| | | | |
|---|---|---|---|
| 2,884,625 | 4/1959 | Kippenhan | 340—147 |
| 2,894,684 | 7/1959 | Nettleton | 340—147 |
| 2,904,781 | 9/1959 | Katz | 340—147 |
| 2,961,643 | 11/1960 | Ayres et al. | 340—174 |
| 2,964,238 | 12/1960 | King et al. | 340—174 |
| 2,973,506 | 2/1961 | Newby | 340—147 |
| 2,973,508 | 2/1961 | Chadurjian | 340—174 |
| 3,049,692 | 8/1962 | Hunt | 340—146.1 |

OTHER REFERENCES

June 1958—IBM Technical Disclosure Bulletin, Memory Address Checking, Bashe, vol. 1, No. 1.

IRVING L. SRAGOW, *Primary Examiner.*